US010614356B2

(12) United States Patent
Feng et al.

(10) Patent No.: US 10,614,356 B2
(45) Date of Patent: Apr. 7, 2020

(54) LOCAL MULTICAST IN SINGLE-HOST MULTI-GPU MACHINE FOR DISTRIBUTED DEEP LEARNING SYSTEMS

(71) Applicant: International Business Machines Corporation, Armonk, NY (US)

(72) Inventors: Minwei Feng, Yorktown Heights, NY (US); Yufei Ren, Somers, NY (US); Yandong Wang, Elmford, NY (US); Li Zhang, Yorktown Heights, NY (US); Wei Zhang, Elmford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 15/495,550

(22) Filed: Apr. 24, 2017

(65) Prior Publication Data

US 2018/0307972 A1   Oct. 25, 2018

(51) Int. Cl.
*G06N 3/063* (2006.01)
*G06N 3/08* (2006.01)
*G06N 3/04* (2006.01)
*G06F 12/1009* (2016.01)
*G06T 1/20* (2006.01)

(52) U.S. Cl.
CPC ......... *G06N 3/063* (2013.01); *G06F 12/1009* (2013.01); *G06N 3/04* (2013.01); *G06N 3/08* (2013.01); *G06T 1/20* (2013.01); *G06F 2212/65* (2013.01)

(58) Field of Classification Search
CPC . G06T 1/20; G06N 3/08; G06N 3/063; G06N 3/04; G06F 12/1009; G06F 2212/65
See application file for complete search history.

(56) References Cited

U.S. PATENT DOCUMENTS

| 8,638,789 B1 | 1/2014 | Pani |
| 8,996,644 B2 | 3/2015 | Pope |
| 9,258,390 B2 | 2/2016 | Pope et al. |
| 9,432,204 B2 | 8/2016 | Shen et al. |
| 9,736,054 B2 | 8/2017 | Bacthu et al. |
| 2006/0067346 A1* | 3/2006 | Tucker ................ G06F 12/1081 370/412 |

(Continued)

OTHER PUBLICATIONS

Anonymously; x86 Based Switching and Management for High Bandwidth Network Functions Virtualization (NFV) Applications, Oct. 6, 2016.

(Continued)

*Primary Examiner* — Michael Le
(74) *Attorney, Agent, or Firm* — Garg Law Firm, PLLC; Rakesh Garg; Joseph Petrokaitis (57) ABSTRACT

A network interface controller of a machine receives a packet including at least one model parameter of a neural network model from a server. The packet includes a virtual address associated with the network interface controller, and the machine further includes a plurality of graphics processing units coupled to the network interface controller by a bus. The network interface controller translates the virtual address to a memory address associated with each of the plurality of graphics processing units. The network interface controller broadcasts the at least one model parameter to the memory address associated with each of the plurality of graphics processing units.

20 Claims, 6 Drawing Sheets

(56) References Cited

U.S. PATENT DOCUMENTS

| | | | |
|---|---|---|---|
| 2010/0061269 A1 | 3/2010 | Banerjee et al. | |
| 2010/0118041 A1* | 5/2010 | Chen | G06F 9/544 |
| | | | 345/542 |
| 2010/0329254 A1 | 12/2010 | Chen et al. | |
| 2014/0237609 A1* | 8/2014 | Sharp | G06F 21/53 |
| | | | 726/26 |
| 2016/0217104 A1 | 7/2016 | Kamble et al. | |
| 2016/0321776 A1* | 11/2016 | Zou | G06T 1/20 |
| 2018/0159771 A1* | 6/2018 | Malloy | H04L 45/7453 |
| 2018/0232316 A1* | 8/2018 | Mirza | G06F 12/1027 |

OTHER PUBLICATIONS

Anonymously; A Method and System for Developing Communication-Optimized Distributed Learning Infrastructure over Clusters of Multi-GPU Nodes, Oct. 19, 2016.

Anonymously; Method and System for Smarter Resource Management for Distributed Deep Learning, Nov. 11, 2016.

Mallampati; Why PCIe-Based Systems Need Multicast, Dec. 7, 2009.

IEEE ; A high performance broadcast design with hardware multicast and GPUDirect RDMA for streaming applications on Infiniband clusters, Jun. 4, 2015.

* cited by examiner

LOCAL MULTICAST IN SINGLE-HOST MULTI-GPU MACHINE FOR DISTRIBUTED DEEP LEARNING SYSTEMS

TECHNICAL FIELD

The present invention relates generally to a method, system, and computer program product for local multicast in single-host multi-GPU machines of a deep learning system. More particularly, the present invention relates to a method, system, and computer program product for local multicast and broadcast of deep learning model parameters for distributed single-host multi-GPU machine deep learning systems.

BACKGROUND

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior. A feedforward neural network is an artificial neural network where connections between the units do not form a cycle.

In machine learning, a convolutional neural network (CNN) is a type of feed-forward artificial neural network in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images.

Convolutional neural networks (CNN) are networks with overlapping "reception fields" performing convolution tasks. A CNN is particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image. Computer vision is a field of endeavor where CNNs are commonly used.

A deep neural network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

Many large scale data-intensive applications rely on both input data and a large number of model parameters to conduct computations. Deep learning algorithms are typical examples of this category. Machine learning algorithms generate models to fit training data and then use the generated models to generate predictions for input data. Models are generally mathematical equations and/or logic having model parameters. Model training is used to find appropriate values of the model parameters, e.g., weights of neural nodes in a neural network, so that the models can provide accurate predictions. In a typical example of training of a model, a batch of image data is input to a model and computations are performed on the image data using the model to provide an output used to train the model.

As the network is trained, the neurons in the intermediate layers organize themselves in such a way that the different neurons learn to recognize different characteristics of a total input space. After training, when an arbitrary input is input to the neural network, neurons in the hidden layer of the network respond with an active output if the new input contains a pattern that resembles a feature that the individual neurons have learned to recognize during their training.

Gradients generated for different items within the same batch are accumulated during batch processing, and normalized at the end of the batch resulting in an iteration for each batch processing. Current deep learning frameworks utilize multiple local graphics processing units (GPUs) to accelerate training. Local GPUs are GPUs that are located within a single node of a machine. Distributed GPUs are GPUs that are located in different machines in communication with one another over a network.

A typical machine may include multiple GPUs located within a node of the machine (which is distinct from a neural node of a neural network), such as a non-uniform memory access (NUMA) node. A NUMA node often includes a physical CPU, memory banks, a network interface controller (NIC), and multiple GPU devices. The network devices and GPUs are typically attached to the CPU through a Peripheral Component Interconnect (PCI) root complex device. A root complex device connects the CPU and memory subsystem to each of the GPUs and the NIC. In addition, multiple machines, each having multiple GPUs, are often networked together to implement a deep learning neural network. During training of the neural network, input data and workloads are distributed over GPUs on a cluster of machines such that each GPU computes parameters for the neural network that must be aggregated and synchronized between the GPUs. Often a parameter server is used to receive parameters from each GPU, aggregate the parameters, and provide updated parameters to each of the GPUs. In other implementations, the GPUs may use peer-to-peer communication to aggregate parameters. Iterative training algorithms such as a stochastic gradient descent algorithm often require the training status or parameters (e.g., a gradient) received from different GPUs to be aggregated and synchronized every few iterations.

Conventionally, each GPU receives the parameter updates from the network independently from the other GPUs such that a network communication must be performed for every GPU implementing the neural network regardless if it is located in a machine having multiple GPUs. As a result, network traffic is greatly amplified as the number of GPUs within a single machine increases which may cause network congestion.

Accordingly, a more efficient method of providing parameter updates within a host machine having multiple GPUs is needed. Various embodiments described herein provide for the use of local multicast to distribute parameters between GPUs in a single host machine to improve network efficiency of multi-GPU based deep learning networks.

SUMMARY

The illustrative embodiments provide a method, system, and computer program product. An embodiment of a method includes receiving, by a network interface controller of a machine, a packet including at least one model parameter of a neural network model, from a server. In the embodiment, the packet includes a virtual address associated with the network interface controller. In the embodiment, the machine further includes a plurality of graphics processing units coupled to the network interface controller by a bus. In the embodiment, the method further includes translating, by the network interface controller, the virtual address to a memory address associated with each of the plurality of graphics processing units. In the embodiment, the method further includes broadcasting, by the network interface controller, the at least one model parameter to the memory address associated with each of the plurality of graphics processing units. At least one embodiment provides for a reduction in network bandwidth utilization during training by alleviating network congestion between a host machine and a server.

In an embodiment, the method further includes storing a mapping of the virtual address to each of the memory addresses associated within a table. In a particular embodiment, the table is stored within the network interface controller.

In an embodiment, the method further includes registering each of the plurality of graphics processing units with the virtual address. In an embodiment, the at least one model parameter includes weights of the neural network model. In a particular embodiment, each of the plurality of graphics processing units is configured to compute a gradient based upon the weights. In another particular embodiment, each of the plurality of graphics processing units is configured to send the computed gradients to the server.

In an embodiment, the network interface controller is a remote direct memory access enabled network interface controller.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein generally relate to local multicast in single-host multi-GPU machines for distributed deep learning systems such as deep learning neural networks. In accordance with one or more embodiments, a machine, such as a server data processing system, includes multiple GPUs. In particular embodiments, a GPU card includes multiple GPUs upon the same card, and the GPU card is configured to be inserted into a node of the machine. In one or more embodiments, multiple machines, each having multiple nodes and GPUs, are in communication with each other to implement a neural network.

In one or more embodiments, local multicast broadcast communication is used to distribute model parameters to different GPU learners within a single host machine in a multi-GPU based deep learning neural network. In one or more embodiments, a host machine includes multiple GPUs configured to train a neural network. In an embodiment, the NIC registers one or more of the multiple GPUs and configures an address mapping table within a memory of the NIC to store an association of multiple GPU memory addresses associated with the registered GPUs of the host machine to a unified virtual address (UVA). In the embodiment, the NIC is further configured to register the address mapping on a network interface of the NIC and maintain the address mapping table to translate incoming packets including the UVA to target GPU memory addresses associated with the registered GPUs.

In one or more embodiments, the NIC receives one or more packets including updated neural network model parameters, such as global weights of the neural network model, at a NIC of the host machine. In one or more embodiments, the packets include the virtual memory address associated with the NIC. In particular embodiments, the NIC receives the updated model parameters from a parameter server in communication with the NIC over a network.

In an embodiment, the NIC determines the GPU memory addresses associated with the UVA, and multicasts the model parameters locally to the multiple GPU devices within the host machine that have registered with the NIC such that each registered GPU receives the same model parameters. In one or more embodiments, each of the registered GPUs receives the updated model parameters, and stores the model parameters within device memory of the GPU. In an embodiment, each of registered GPUs performs a training iteration on the received model parameters to calculate new model parameters and sends the new model parameters to the parameter server via the NIC. In one or more embodiments, the NIC continues to receive updated model parameters and multicast broadcast the updated model parameters to the local GPUs associated with the NIC until the neural network model is trained to a satisfactory level.

The illustrative embodiments are described with respect to certain types of GPUs, machines, deep learning systems, neural networks, neural network models, neural network model parameters, multicast broadcast procedures, transmissions, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
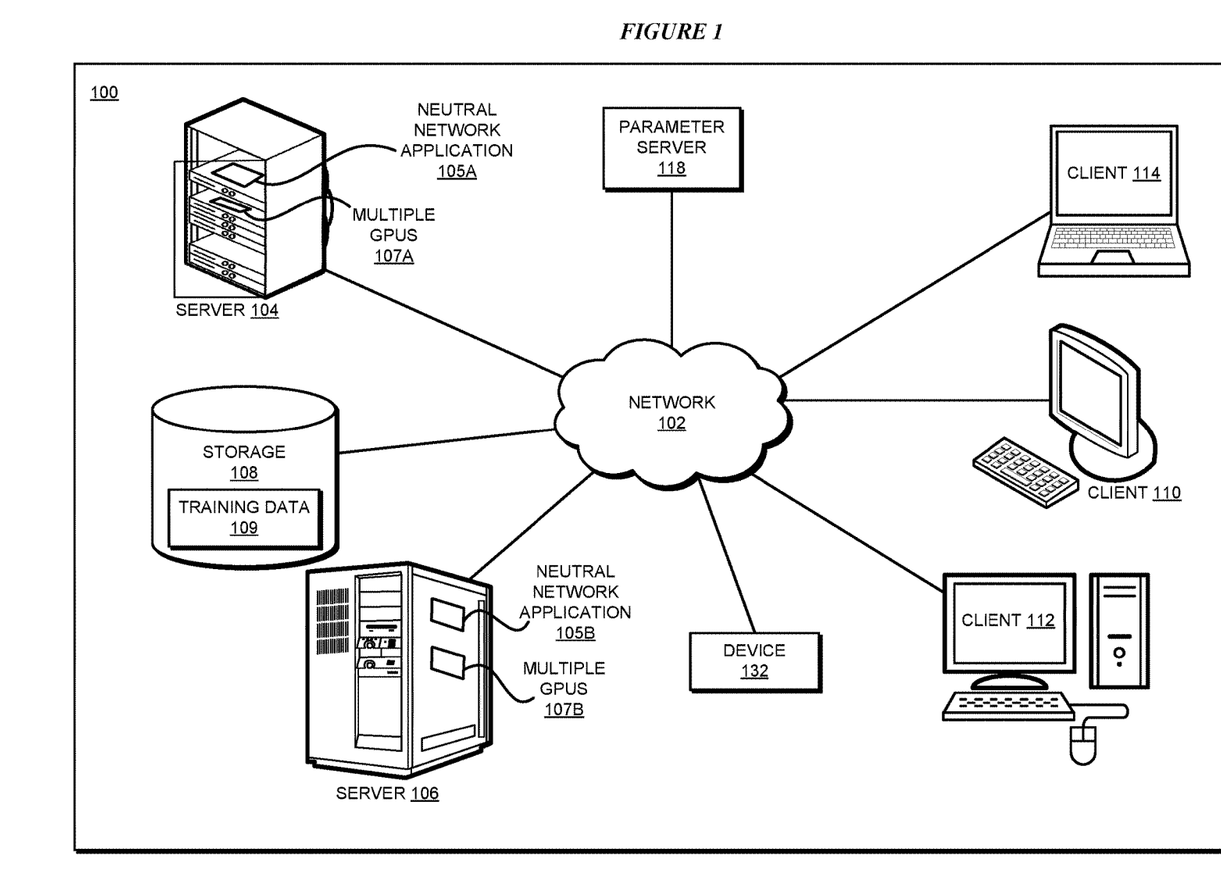
FIG. 1 depicts a block diagram of a network of data processing systems in which illustrative embodiments may be implemented.
Figure 2:
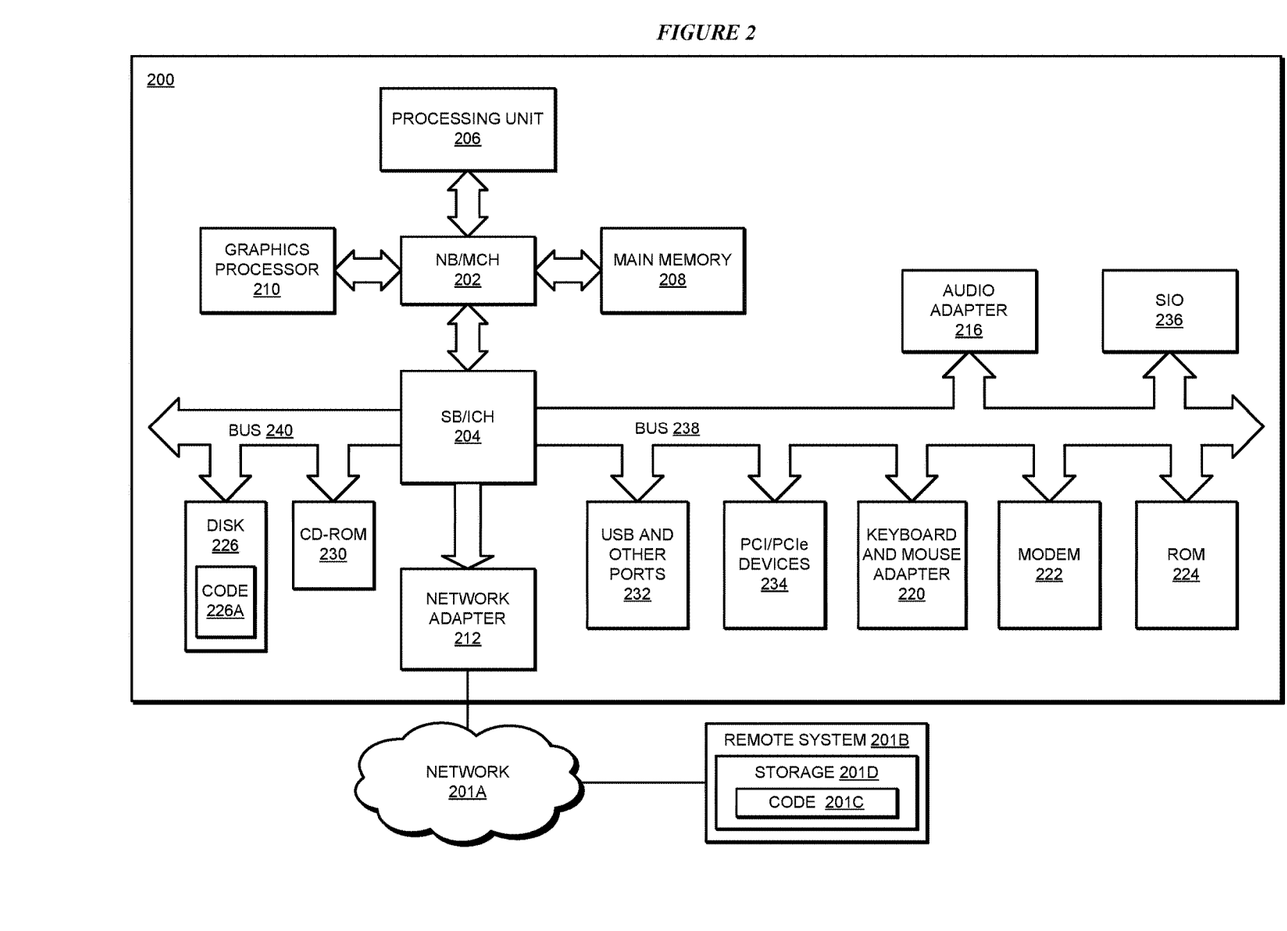
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store training data 109, such as image data, for training a neural network. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

In an embodiment, one or more of neural network application 105A of server 104 and neural network application 105B of server 106 implements an embodiment of a neural network, such as a deep learning neural network, as described herein. In a particular embodiment, the neural network is implemented using one of network application 105A and network application 105B within a single server. In another particular embodiment, the neural network is implemented using both neural network application 105A and neural network application 105B within a single server. Server 104 includes multiple GPUs 107A including multiple nodes in which each node may include one or more GPUs as described herein. Similarly, server 106 includes multiple GPUs 107B including multiple nodes in which each node may include one or more GPUs as described herein.

Parameter server 118 is an example of a parameter server as described herein. In one or more embodiments, parameter server 118 is configured to receive neural network model parameters from each GPU, aggregate the parameters, and provide updated parameters to each of the GPUs.

Device 132 is an example of a device described herein. For example, device 132 may send a request to server 104 to perform one or more data processing tasks by neural network applications 105A, 105B such as initiating training of the neural network. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications.

Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105A and 105B in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
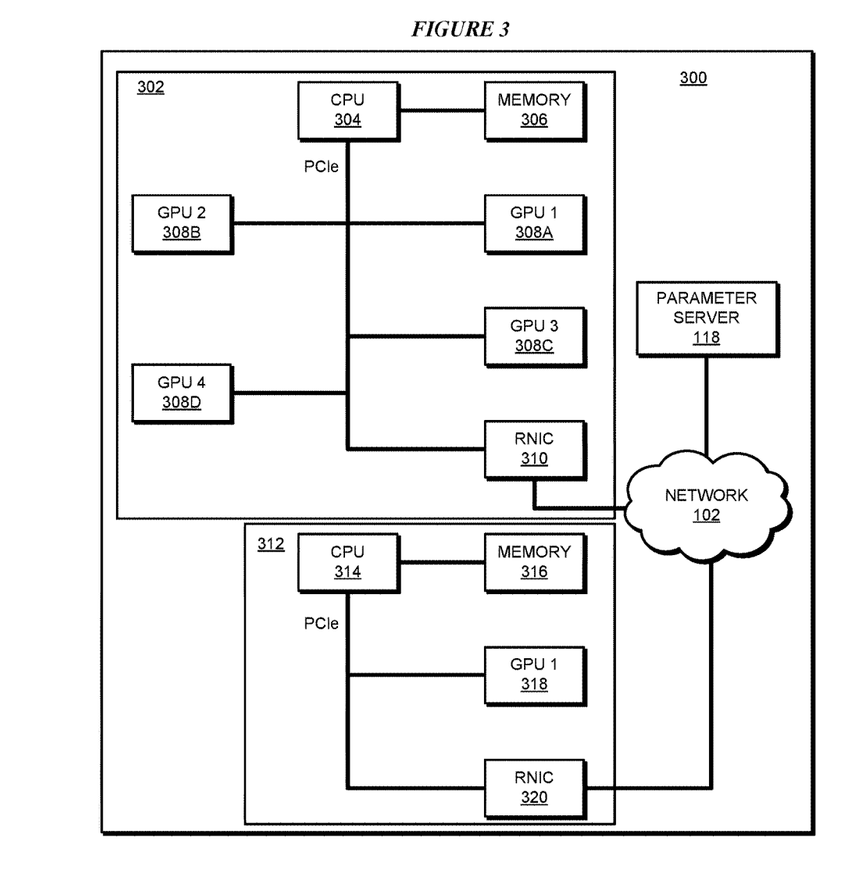
FIG. 3 depicts a simplified block diagram of a multi-machine multi-GPU architecture in which illustrative embodiments may be implemented.

With respect to FIG. 3, this figure depicts a simplified block diagram of a multi-machine multi-GPU architecture 300 in which illustrative embodiments may be implemented. In an embodiment, neural network architecture 300 includes a first machine 302 and a second machine 312. In an embodiment, first machine 302 includes server 104 of FIG. 1 and second machine 304 includes server 106 of FIG. 1. In one or more embodiments, first machine 302 executes neural network application 105A and second machine 304 executes neural network application 105B to implement a deep learning neural network. In an embodiment, first machine 302 includes a CPU 304, a memory 306, a first GPU 308A, a second GPU 308B, a third GPU 308C, a fourth GPU 308D, and a remote direct memory access (RDMA) enabled NIC (RNIC) 310. In the particular embodiment, RNIC 310 is in communication with CPU 304, first GPU 308A, second GPU 308B, third GPU 308C, and fourth GPU 308D via a PCIe bus.

In the embodiment, second machine 312 includes a CPU 313, a memory 316, a 318, a second GPU 308B, a third GPU 308C, a fourth GPU 308D, and an RNIC 320. RNIC 310 of first machine 302 and RNIC 320 of second machine 312 is each in communication with a parameter server 118 via a network 102. In the particular embodiment, RNIC 312 is in communication with CPU 314 and first GPU 318 via a PCIe bus.

During traditional neural network training, each GPU learner downloads a latest version of the model parameters, (e.g, weights) from the parameter server, computes gradients based upon the weights, and uploads the gradients to the parameter server. In a traditional host-stage communication, a host CPU is required to copy data into GPU memory. As a result, a staged buffer is required in the host memory. When a GPU learner receives parameters updates, the parameter updates are stored in memory of the RNIC, copied to host memory associated with the CPU memory, and then copied to the GPU memory. When a GPU learner computes updated gradients, the updated gradients are copied from GPU memory to host memory, and then copied from host memory to the RNIC. RDMA is a direct memory access technique in which data stored in memory of a first device is directly copied into memory of a second device without requiring the use of a host CPU. GPUDirect RDMA provides for a direct memory path for data exchange between the GPU and RDMA devices using standard features of PCIe. An advantage provided by GPUDirect RDMA is that copying of data to the host CPU memory and the allocation of staging buffer memory is not required. However, even with the use of GPUDirect RDMA, each of the GPUs receives parameter updates from the network independently from the parameter server such that a separate transmission of the updated parameters from the parameter server is required for each of the GPUs within a machine. In addition, network multicast, such as Ethernet multicast, includes a network based association, and existing RDMA multicast can only forward a received packet to a single memory address on a GPU.

In one or more embodiments described herein implement a local multicast broadcast procedure to allow updated model parameters to be distributed to each GPU of a host machine. In a particular embodiment, RNIC 310 of machine 302 receives updated model parameters from parameter server 118, determines GPU memory addresses associated with one or more GPUs 308A-308D within machine 302, and uses a multicast broadcast procedure to broadcast the updated model parameters to a GPU memory address associated with each of the one or more GPUs 308A-308D.

Figure 4:
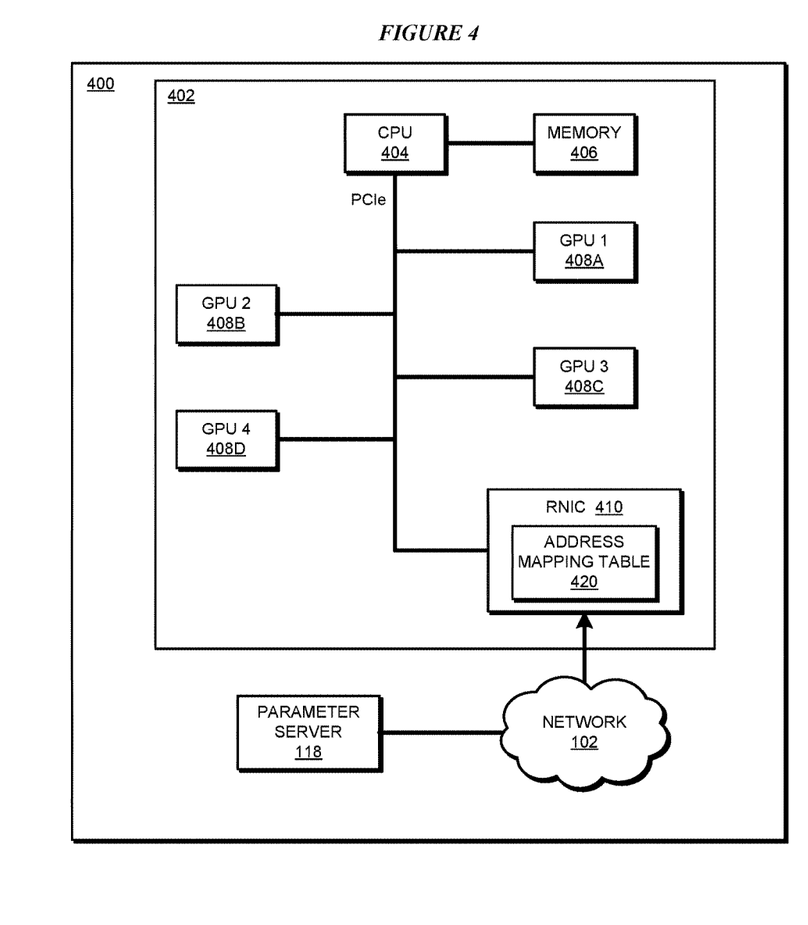
FIG. 4 depicts a simplified block diagram of another multi-machine, multi-GPU architecture in which illustrative embodiments may be implemented.

With respect to FIG. 4, this figure depicts a simplified block diagram of another multi-machine, multi-GPU architecture 400 in which illustrative embodiments may be implemented. In an embodiment, neural network architecture 400 includes a machine 402 in communication with parameter server 118 via network 102. In an embodiment, machine 402 includes server 104 of FIG. 1. In one or more embodiments, machine 402 executes neural network application 105A to implement a portion of a deep learning neural network. In an embodiment, machine 402 includes a CPU 404, a memory 406, a first GPU 408A, a second GPU 408B, a third GPU 408C, a fourth GPU 408D, and an RNIC 410. In the particular embodiment, RNIC 410 is in communication with CPU 404, first GPU 408A, second GPU 408B, third GPU 408C, and fourth GPU 408D via a PCIe bus. Although, the embodiment FIG. 4 is illustrated as including machine 402 in communication with parameter server 118, it should be understood that various embodiments may include additional machines, each having one or more GPUs, in communication with parameter server 118 to implement a neural network.

In one or more embodiments, RNIC 410 includes an address mapping table 420 stored therein. Address mapping table 420 stores an association of a unified virtual address (UVA) with a particular GPU memory address associated with each of first GPU 408A, second GPU 408B, third GPU 408C, and fourth GPU 408D. In a particular embodiment, RNIC 410 is configured to maintain the address mapping table to translate an incoming packet including the unified virtual address to target GPU memory addresses, support channel send/receive, support RDMA read/write operations, and support RDMA network multicast.

Figure 5:
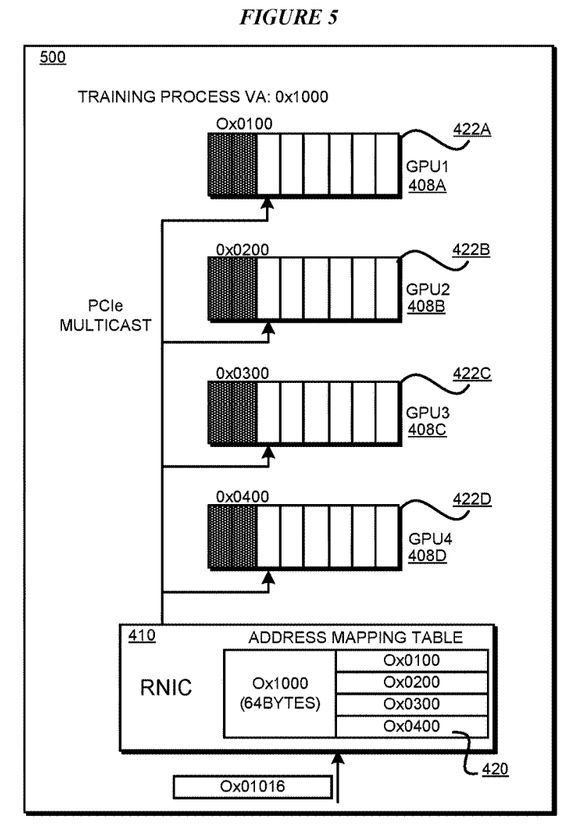
FIG. 5 depicts an example mapping of a virtual address to GPU memory addresses within an address mapping table in accordance with an illustrative embodiment.

With reference to FIG. 5, this figure depicts an example mapping 500 of a virtual address to GPU memory addresses within an address mapping table 420 in accordance with an illustrative embodiment. In the illustrated example, address mapping table includes a unified virtual address "0x1016" mapped to physical addresses associated with each of first GPU 408A, second GPU 408B, third GPU 408C, and fourth GPU 408D. In the illustrated example, first GPU 408A has an associated a physical GPU memory address of "0x0100", second GPU 408B has an associated a physical GPU memory address of "0x0200", third GPU 408C has an associated a physical GPU memory address of "0x0300", and fourth GPU 408D has an associated a physical GPU memory address of "0x0400". Since each of first GPU 408A, second GPU 408B, third GPU 408C, and fourth GPU 408D receive the same training data, the four physical addresses can be mapped to one unified virtual address.

Referring again to FIG. 4, in an embodiment RNIC 410 receives updated model parameters from parameter server 118 within a packet including an address field containing the unified virtual address associated with RNIC 410. In the embodiment, RNIC 410 accesses the address mapping table to translate the received unified virtual address to four physical GPU addresses. In the embodiment, RNIC 410 further broadcasts the updated model parameters to each of the four physical GPU addresses associated with each of first GPU 408A, second GPU 408B, third GPU 408C, and fourth GPU 408D.

In a particular embodiment, an ibv_reg_mr( ) function of a system programming interface used to register a memory region is extended to accept multiple GPU memory addresses, and return a unified VA. In a particular embodiment, RNIC 410 requests sends a request to the PCIe root complex to requesting to become the PCI bus master to allow RNIC 410 to send traffic to the other devices, GPUs 408A-408D, on the PCIe interconnect. In the particular embodiment, the PCIe root complex grants RNIC 410 as the PCIe bus master, and RNIC 410 initiates a multicast transaction. In the particular embodiment, RNIC 410 issues a Special Cycle (broadcast) on PCI lanes of the PCIe interconnect to send a multicast broadcast to registered GPU devices including the updated model parameters.

After receiving each of first GPU 408A, second GPU 408B, third GPU 408C, and fourth GPU 408D receiving the updated model parameters, each respective GPU 408A-408D computes gradients of weights, or other model parameters, using the received updated model parameters, and sends the computed gradients to parameter server 118.

Figure 6:
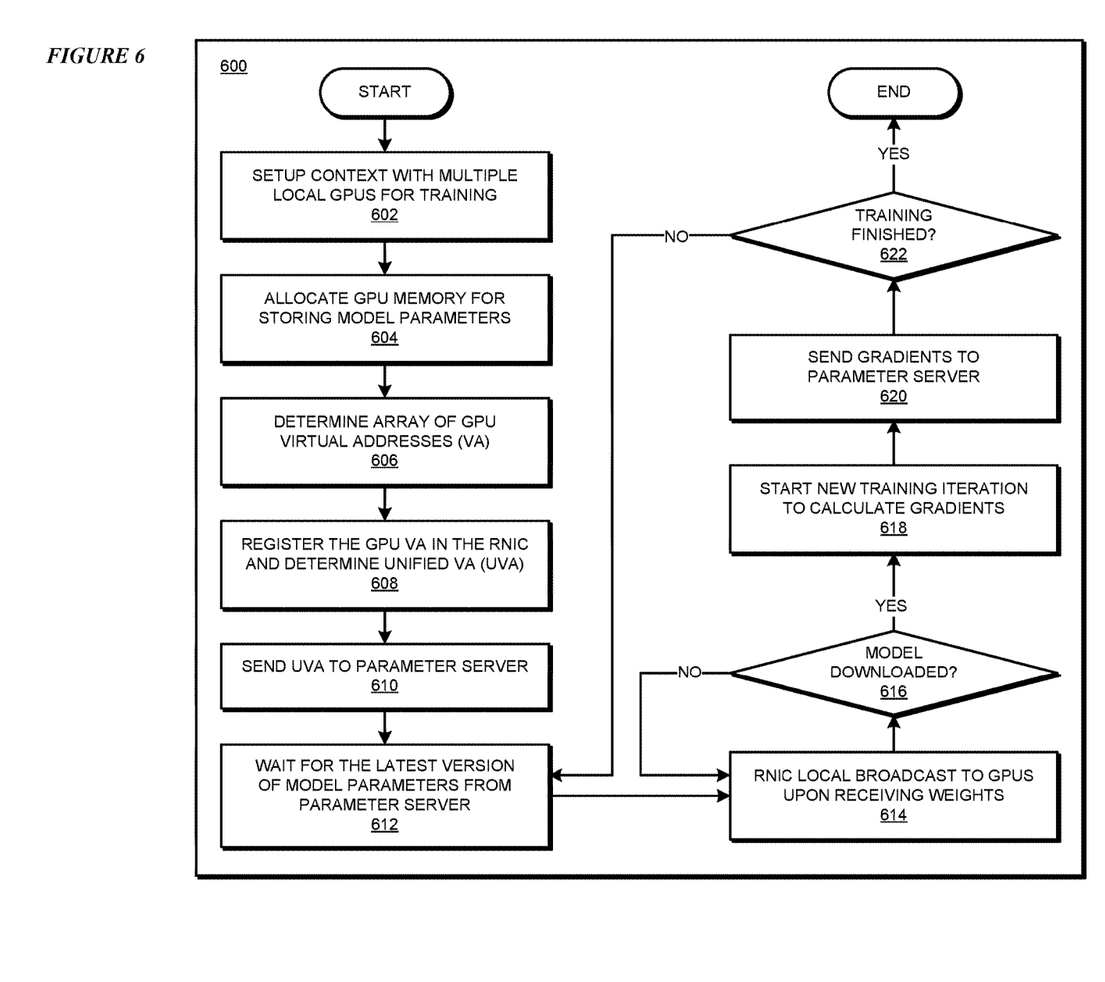
FIG. 6 depicts a flowchart of an example process for local multicast broadcast of neural network model parameters in accordance with an illustrative embodiment.

With reference to FIG. 6, this figure depicts a flowchart of an example process 600 for local multicast broadcast of neural network model parameters in accordance with an illustrative embodiment. In block 602, machine 402 sets up a context associating multiple GPUs 408A-408D of machine 402 as learners for a training process of a neural network having an associated neural network model. In block 604, machine 402 allocates GPU memory for each of GPUs 408A-408D for storing received model parameters of the neural network model. In block 606, RNIC 410 of machine 402 determines an array of GPU virtual addresses (VAs) for memory addresses of each GPU 408A-408D. In block 608, RNIC 410 registers the GPU VAs in address mapping table 420 and determines a unified virtual address (UVA) to associate with the GPU memory addresses. In block 610, RNIC 410 sends the UVA to parameter server 118 and parameter server 118 associates the virtual address with RNIC 410.

In block 612, RNIC 410 waits for a latest version of updated model parameters within a packet including an address field including a unified virtual address (UVA) from parameter server 118. In block 614, RNIC 420 matches the UVA to the physical addresses associated with GPU memory of each of GPUs 408A-408D contained within address mapping table 420, and locally broadcasts the updated model parameters to each of GPUS 408A-408D using multicast broadcast. In block 616, RNIC 410 determines whether all of the updated model parameters for the model have been downloaded. If all of the updated model parameters have not been downloaded for the model, the process 600 returns to block 612. If all of the updated model parameters have been downloaded for the model, the process continues to block 618.

In block 618, each of GPUs 408A-408D start a new training iteration to compute gradients based upon the updated model parameters. In block 620, each of GPUs 408A-408D send the computed gradients to parameter server 118 via RNIC 410. In block 622, RNIC 410 determines whether training has finished. If training has not finished, the process 600 returns to block 612 to wait for new updated model parameters from parameter server 118. If training has finished, process 600 then ends. Although in various embodiments processes are described as being performed an RNIC in other embodiments the processes may be performed by one or more GPUs, one or more applications, or a combination of applications and GPUs. In accordance with at least one embodiment, local multicast of model parameters in multi-GPU based deep learning networks provides for a reduction in network bandwidth utilization during training by alleviating network congestion between a host machine and a parameter server.

Although various embodiments are described with respect to operations within a neural network, it should be understood that the principles described herein may be applied to any suitable data processing operations performed by a computer system or other electronic device.

Thus, a computer implemented method, system or apparatus, and computer program product are provided in the illustrative embodiments for local multicast operations with a neural network and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
 configuring a plurality of graphics processing units of a machine to operate as a deep learning neural network, the plurality of graphics processing units coupled to a network interface controller of the machine;

configuring a graphics processing unit in the plurality of graphics processing units to compute a set of parameters of a neural network model wherein the set of parameters cause the neural network model to be trained for a given set of input training data; and
configuring each graphics processing unit in the plurality of graphics processing units to transmit to a neural network parameter server (server) a corresponding set of parameters of the neural network model, but instead of each graphics processing unit receiving an updated set of parameters of the neural network model individually from the server, receiving the updated set of parameters of the neural network model as a local broadcast within the machine from the network interface controller of the machine, wherein receiving the updated set of parameters locally within the machine comprises:
receiving, by the network interface controller of the machine, a packet including at least one model parameter of the neural network model, from a server, the packet including a virtual address associated with the network interface controller;
translating, by the network interface controller, the virtual address to a plurality of memory addresses, each memory address associated with a corresponding one of the plurality of graphics processing units; and
broadcasting, using a local multicast by the network interface controller, the at least one model parameter to the plurality of memory addresses associated with the plurality of graphics processing units.

2. The method of claim 1, further comprising storing a mapping of the virtual address to each of the plurality of memory addresses associated within a table.

3. The method of claim 2, wherein the table is stored within the network interface controller.

4. The method of claim 1, further comprising registering each of the plurality of graphics processing units with the virtual address.

5. The method of claim 1, wherein the at least one model parameter includes weights of the neural network model.

6. The method of claim 5, wherein each of the plurality of graphics processing units is configured to compute a gradient based upon the weights.

7. The method of claim 6, wherein each of the plurality of graphics processing units is configured to send the computed gradients to the server.

8. The method of claim 1, wherein the network interface controller is a remote direct memory access enabled network interface controller.

9. A computer usable program product comprising one or more computer-readable storage mediums, and program instructions stored on at least one of the one or more storage devices, the stored program instructions comprising:
program instructions to configure a plurality of graphics processing units of a machine to operate as a deep learning neural network, the plurality of graphics processing units coupled to a network interface controller of the machine;
program instructions to configure a graphics processing unit in the plurality of graphics processing units to compute a set of parameters of a neural network model wherein the set of parameters cause the neural network model to be trained for a given set of input training data; and
program instructions to configure each graphics processing unit in the plurality of graphics processing units to transmit to a neural network parameter server (server) a corresponding set of parameters of the neural network model, but instead of each graphics processing unit receiving an updated set of parameters of the neural network model individually from the server, receiving the updated set of parameters of the neural network model as a local broadcast within the machine from the network interface controller of the machine, wherein receiving the updated set of parameters locally within the machine comprises:
program instructions to receive, by the network interface controller of the machine, a packet including at least one model parameter of the neural network model, from a server, the packet including a virtual address associated with the network interface controller;
program instructions to translate, by the network interface controller, the virtual address to a plurality of memory addresses, each memory address associated with a corresponding one of the plurality of graphics processing units; and
program instructions to broadcast, using a local multicast by the network interface controller, the at least one model parameter to the plurality of memory addresses associated with the plurality of graphics processing units.

10. The computer usable program product of claim 9, further comprising:
program instructions to store a mapping of the virtual address to each of the plurality of memory addresses associated within a table.

11. The computer usable program product of claim 10, wherein the table is stored within the network interface controller.

12. The computer usable program product of claim 9, further comprising:
program instructions to register each of the plurality of graphics processing units with the virtual address.

13. The computer usable program product of claim 9, wherein the at least one model parameter includes weights of the neural network model.

14. The computer usable program product of claim 13, wherein each of the plurality of graphics processing units is configured to compute a gradient based upon the weights.

15. The computer usable program product of claim 14, wherein each of the plurality of graphics processing units is configured to send the computed gradients to the server.

16. The computer usable program product of claim 9, wherein the network interface controller is a remote direct memory access enabled network interface controller.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage mediums, and program instructions stored on at least one of the one or more storage devices for execution by at least one of the one or more processors via at least one of the one or more memories, the stored program instructions comprising:

program instructions to configure a plurality of graphics processing units of a machine to operate as a deep learning neural network, the plurality of graphics processing units coupled to a network interface controller of the machine;

program instructions to configure a graphics processing unit in the plurality of graphics processing units to compute a set of parameters of a neural network model wherein the set of parameters cause the neural network model to be trained for a given set of input training data; and program instructions to configure each graphics processing unit in the plurality of graphics processing units to transmit to a neural network parameter server (server) a corresponding set of parameters of the neural network model, but instead of each graphics processing unit receiving an updated set of parameters of the neural network model individually from the server, receiving the updated set of parameters of the neural network model as a local broadcast within the machine from the network interface controller of the machine, wherein receiving the updated set of parameters locally within the machine comprises:

program instructions to receive, by the network interface controller of the machine, a packet including at least one model parameter of the neural network model, from a server, the packet including a virtual address associated with the network interface controller;

program instructions to translate, by the network interface controller, the virtual address to a plurality of memory addresses, each memory address associated with a corresponding one of the plurality of graphics processing units; and program instructions to broadcast, using a local multicast by the network interface controller, the at least one model parameter to the plurality of memory addresses associated with the plurality of graphics processing units.

20. The computer system of claim 19, further comprising:
program instructions to store a mapping of the virtual address to each of the plurality of memory addresses associated within a table.

* * * * *